US012192101B2

(12) United States Patent
Pei et al.

(10) Patent No.: US 12,192,101 B2
(45) Date of Patent: Jan. 7, 2025

(54) SECURE DATA CONNECTIONS IN LOW DATA RATE NETWORKS

(71) Applicants: The Boeing Company, Chicago, IL (US); Commonwealth Scientific and Industrial Research Organisation, Acton (AU)

(72) Inventors: Guangyu Pei, Bellevue, WA (US); Dongxi Liu, Eastwood (AU); Surya Nepal, Northmead (AU); Nan Li, Maryland (AU)

(73) Assignees: The Boeing Company, Arlington, VA (US); Commonwealth Scientific and Industrial Research Organisation, Acton (AU)

( * ) Notice: Subject to any disclaimer, the term of this patent is extended or adjusted under 35 U.S.C. 154(b) by 359 days.

(21) Appl. No.: 17/522,763

(22) Filed: Nov. 9, 2021

(65) Prior Publication Data

US 2022/0182320 A1 Jun. 9, 2022

Related U.S. Application Data

(60) Provisional application No. 63/121,327, filed on Dec. 4, 2020.

(51) Int. Cl.
*H04L 45/74* (2022.01)
(52) U.S. Cl.
CPC .................... *H04L 45/74* (2013.01)
(58) Field of Classification Search
CPC ......... H04L 45/74; H04L 69/04; H04L 69/08; H04L 69/16; H04L 69/22;
(Continued)

(56) References Cited

U.S. PATENT DOCUMENTS 7,154,891 B1 * 12/2006 Callon .................... H04L 61/00
370/392
8,260,888 B2 * 9/2012 Zheng ................. H04L 61/5046
709/222
(Continued)

FOREIGN PATENT DOCUMENTS

CN 104426892 A 3/2015
CN 107332752 A 11/2017
(Continued)

OTHER PUBLICATIONS

"Implementation and Analysis of the 6LowPAN for Internet of Things Applications: Future Networks"; Mohamed et al.; International Journal of Computer Science and Information Security vol. 17, No. 4, Apr. 2019 (Year: 2019).*

(Continued)

*Primary Examiner* — Benjamin H Elliott, IV
(74) *Attorney, Agent, or Firm* — Harrity & Harrity, LLP

(57) ABSTRACT

Described are methods and devices for communication between local networks and global networks. In some examples, a method comprises storing mapping data for multiple hosts in a global network and in a local network. The method further comprises receiving a first data packet from one of the multiple hosts in the local network. The first data packet comprises a first source address being the local network address of the host in the local network, a first destination address being the local network address of the host in the global network and payload data. The method further comprises determining, based on the mapping data, the global network address of the host in the local network and a global network address of the host in the global network, and sending a second data packet over the global network.

20 Claims, 11 Drawing Sheets

(58) Field of Classification Search
CPC ......... H04L 2101/659; H04L 2101/681; H04L 67/12; H04L 61/2514; H04L 43/08; H04L 67/06

See application file for complete search history.

(56) References Cited

U.S. PATENT DOCUMENTS

| | | | |
|---|---|---|---|
| 2004/0037316 A1* | 2/2004 | Choi | H04L 69/167 370/466 |
| 2009/0146833 A1* | 6/2009 | Lee | H04L 69/16 340/9.13 |
| 2010/0202355 A1* | 8/2010 | Kim | H04W 36/385 370/328 |
| 2010/0303027 A1* | 12/2010 | Fernandez Gutierrez | H04L 61/5092 370/329 |
| 2011/0317673 A1* | 12/2011 | Shelby | H04W 4/14 370/338 |
| 2013/0028095 A1* | 1/2013 | Vasseur | H04L 45/54 370/241 |
| 2013/0215810 A1* | 8/2013 | Wang | H04L 45/74 370/311 |
| 2013/0235862 A1* | 9/2013 | Kahng | H04W 28/06 370/338 |
| 2014/0064259 A1* | 3/2014 | Lee | H04L 45/74 370/338 |
| 2016/0149856 A1* | 5/2016 | Hui | H04L 61/5014 370/252 |
| 2017/0034316 A1* | 2/2017 | Pei | H04L 41/0856 |
| 2019/0356504 A1* | 11/2019 | Tappeiner | H04L 12/2816 |
| 2020/0136429 A1* | 4/2020 | Susilo | H04W 4/38 |
| 2022/0182320 A1* | 6/2022 | Pei | H04L 61/2514 |
| 2023/0199610 A1* | 6/2023 | Hui | H04L 12/2807 370/328 |

FOREIGN PATENT DOCUMENTS

| | | |
|---|---|---|
| CN | 109151089 A | 1/2019 |
| EP | 3108675 B1 | 8/2017 |
| WO | 2011119019 A1 | 9/2011 |

OTHER PUBLICATIONS

"6LowPAN: Incorporating IEEE 802.15.4 into the IP architecture"; Hui et al.; Internet Protocol for Smart Objects (IPSO) Alliance White paper #3; Jan. 2009 (Year: 2009).*

Low Power Device Synchronization Protocol for IPv6 over Low Power Wireless Personal Area Networks (6LowPAN) in Internet of Things (IoT); Rajesh et al.; 2020 (Year: 2020).*

"Mobile IPv6 in Internet of Things: Analysis, experimentations and optimizations"; Montavont et al.; Ad Hoc Networks 14 (Year: 2014).*

"An Improved Header Compression Scheme for 6LowPAN Networks"; Huiqin et al.; 2010 Ninth International Conference on Grid and Cloud Computing; Jan. 2011 (Year: 2011).*

Compression Format for IPv6 Datagrams over IEEE 802.15.4-Based Networks; RFC 6282; Hui et al.; Sep. 2011 (Year: 2011).*

"RFC 8930 On Forwarding 6LoWPAN Fragments over a Multi-Hop IPv6 Network"; Watteyne et al.; Nov. 2020 (Year: 2020).*

"RFC 9159 IPv6 Mesh over Bluetooth(R) Low Energy Using the Internet Protocol Support Profile (IPSP)"; Gomez et al.; Dec. 2021 (Year: 2021).*

"Wireless Low Power Area Networks in the Internet of Things: A Glimpse on 6LowPAN"; Chere et al.; 2019 International Conference on Electronics, Information, and Communication (ICEIC); May 2019 (Year: 2019).*

"A Gateway Solution for IPv6 Wireless Sensor Networks"; Rao et al.; 2009 International Conference on Ultra Modern Telecommunications & Workshops; Dec. 2009 (Year: 2009).*

"Internetworking Between ZigBee/802.15.4 and IPv6/802.3 Network"; Wang et al.; 2007 (Year: 2007).*

"6GLAD: IPv6 Global to Link-layer ADdress Translation for 6LoWPAN Overhead Reducing"; Zimmermann et al.; Next Generation Internet Networks, Apr. 2008 (Year: 2008).*

Australian provisional application serial No. 2020904498, Search Report mailed May 18, 2021.

Ma Li et al., "IP communication optimization for 6LoWPAN-Based Wireless Sensor Networks", Sensors & Transducers, vol. 174, Issue 7, Jul. 31, 2014, pp. 81-87.

Wang Reen-Cheng et al., "Internetworking Between ZigBee/802.15.4 and IPv6/802.3 Network", SIGCOMM Workshop, Kyoto, Japan, Aug. 31, 2007.

Andre Zimmermann et al: "6GLAD: IPv6 Global to Link-layer ADdress Translation for 6L0WPAN Overhead Reducing", Next Generation Internet Networks, 2008. NGI 2008, IEEE, Apr. 28, 2008, pp. 209-214, XP031248149, 6 pages.

European Extended Search Report, Application No. 21211692.5, dated Mary 2, 2022, 8, pages.

Gopinath et al: "A gateway solution for IPv6 wireless sensor networks", Ultra Modern Telecommunications & Workshops, 2009. ICUMT '09. International Conference on, IEEE, Oct. 12, 2009, XP031574470, 11 pages.

Wasserman et al "IPv6-to-IPv6 Network Prefix Translation; 3 rfc6296.txt", IETF Standard, Jun. 29, 2011, XP015076059.

* cited by examiner

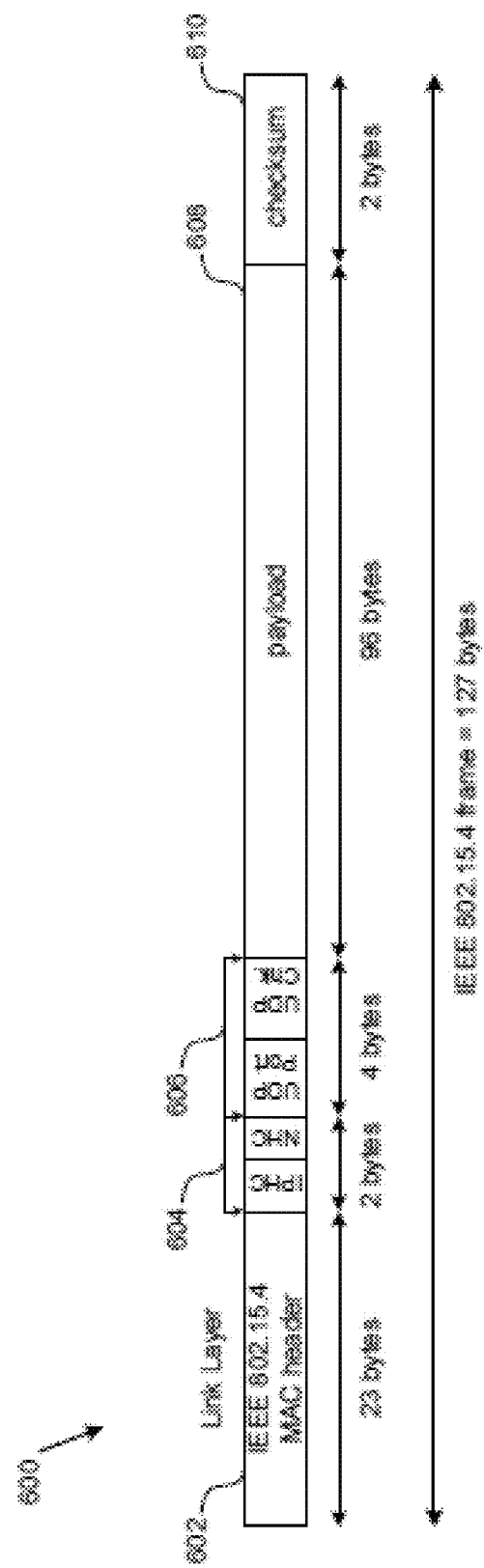

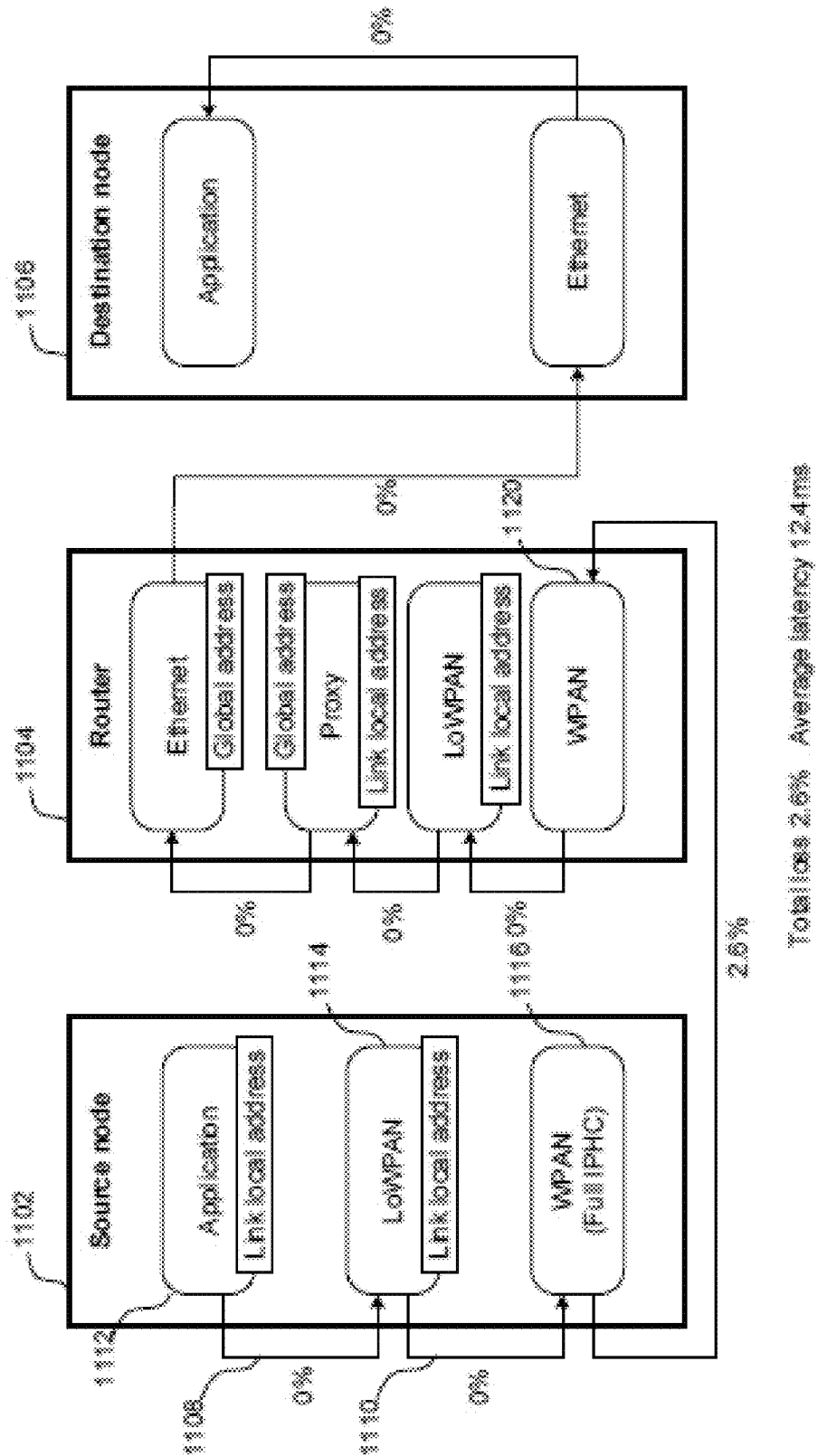

SECURE DATA CONNECTIONS IN LOW DATA RATE NETWORKS

CROSS-REFERENCE TO RELATED APPLICATIONS

This application claims the benefit under 35 U.S.C. § 119(e) of U.S. Provisional Patent Application No. 63/121,327, filed on 2020-12-04, which is incorporated herein by reference in its entirety for all purposes,

TECHNICAL FIELD

This disclosure relates to systems and method for secure data connections in low rate networks.

BACKGROUND

In recent years, there has been a proliferation of smart devices that are network connected, These smart devices include devices within the home, car or office, smart medical implants, or sensing devices within factories and farms, Such devices can form an Internet of Things (IoT), which is a network of physical objects that are embedded with sensors, software, and other technologies for the purpose of connecting and exchanging data with other devices and systems over a communication network.

As IoT devices are often small, with limited power and processing complexity, IoT devices often communicate over low-power, low-data-rate communication networks. Additionally, some IoT networks are mesh networks, in which IoT devices connect directly, dynamically, and non-hierarchically to one or more other devices via the mesh network connections, and cooperate with other devices to efficiently route data to and from nodes. Accordingly, communication protocols have been developed which are suitable to the low-power, low-data-rate, mesh network communication of an IoT network.

Often it is desirable that these smart devices are able to communicate, outside the local mesh network, with devices on global networks, such as the Internet, to send and receive data. The communication protocol requirements for communication over the global network can be complex and multi-faceted. Accordingly, such communication protocols may not be suitable for low-power, low-rate, low processing power devices, and adherence to such protocols can result in a reduction in efficiency and throughput of communication from IoT devices.

Accordingly, it is desirable to have a means to facilitate efficient communication between IoT nodes operating protocols suitable for low-power, low-complexity devices, and global hosts operating communication protocols suitable for global communication.

Any discussion of the prior art throughout the specification should in no way be considered as an admission that such prior art is widely known or forms part of the common general knowledge in the field.

Throughout this specification, the word 'comprise', or variations such as 'comprises' or 'comprising', will be understood to imply the inclusion of a stated element, integer or step, or group of elements, integers or steps, but not the exclusion of any other element, integer or step, or group of elements, integers or steps.

SUMMARY

The present disclosure provides a router method and device which enables nodes within a local network, designed for low-power, low data throughput, to communicate with nodes within a global network, using compressible link-local source and destination addresses within the local network, and globally unique source and destination addresses within the global network. The compressibility of the link-local source and destination addresses within the local network provide increased bandwidth for payload data and reduce fragmentation of payloads.

In some examples, there is provided a method, performed by an edge router, for communication between a local network and a global network. The method comprises storing mapping data comprising, for multiple hosts in the global network, a respective global network address and a respective local network address. The mapping data further comprising, for multiple hosts in the local network, a respective global network address and a respective local network address. The method further comprises receiving a first data packet from one of the multiple hosts in the local network. The first data packet comprises a first source address being the local network address of the host in the local network, a first destination address being the local network address of the host in the global network, and payload data. The method further comprises determining, based on the stored mapping data, the global network address of the host in the local network and a global network address of the host in the global network, and sending a second data packet over the global network. The second data packet comprises a second source address being the global network address of the host in the local network, a second destination address being the global network address of the host in the global network, and the payload data.

In some examples, the local network is a mesh network. For example, the local network is a 6LoWPAN based network. The first source address is an IPv6 link-local address, The first destination address is an IPv6 link-local address. The global network is an IPv6 based network. The second source address is an IPv6 unicast address. The second destination address is an IPv6 unicast address.

In some examples, the first data packet further comprises a compressed network layer header. In more specific examples, the method further comprises decompressing a header of the first data packet to determine the first source address and the first destination address. For example, the payload data is encrypted.

In some examples, the method further comprises storing configuration data comprising a list of one or more global network addresses, each address corresponding to one of one or more global hosts in the global network.

In some examples, the method further comprises receiving a first data packet from one of the multiple hosts in the local network and a second data packet from another one of the multiple hosts in the local area network, and performing the step of determining the global network address of the host in the local network and a global network address of the host in the global network for the first data packet and the second data packet in parallel.

In some examples, there is provided a method, performed by an edge router, for communication between a global network and a local network. The method comprises storing mapping data comprising, for multiple hosts in the global network, a respective global network address and a respective local network address. The mapping data further comprises, for multiple hosts in the local network, a respective global network address and a respective local network address. The method further comprises receiving a first data packet from one of the multiple hosts in the global network. The first data packet comprises a first source address being the global network address of the host in the global network, a first destination address being the global network address of the host in the local network, and payload data. The method further comprises determining, based on the stored mapping data, the local network address of the host in the global network and a local network address of the host in the local network, and sending a second data packet over the local network. The second data packet comprises a second source address being the local network address of the host in the global network, a second destination address being the local network address of the host in the local network, and the payload data.

In some examples, the local network is a 6LoWPAN based network. For example, the second source address is an IPv6 link-local address. The second destination address is an IPv6 link-local address. The global network is an IPv6 based network. The first source address is an IPv6 unicast address. The first destination address is an IPv6 unicast address.

In some examples, the second data packet further comprises a compressed network layer header. For example, the method further comprises determining the compressed network layer header of the second data packet, based on the second source address and the second destination address.

In some examples, there is provided a device, for communication between a local network and a global network. The device comprises a processor, and a mapping data store for storing mapping data, the mapping data comprising, for multiple hosts in the global network, a respective global network address and a respective local network address. The mapping data further comprising, for multiple hosts in the local network, a respective global network address and a respective local network address. The processor configured to, in response to receiving a first data packet from one of the multiple hosts in the local network, the first data packet comprising a first source address being the local network address of the host in the local network, a first destination address being the local network address of the host in the global network, and payload data, determine, based on the stored mapping data, the global network address of the host in the local network and a global network address of the host in the global network, and send a second data packet over the global network. The second data packet comprises a second source address being the global network address of the host in the local network, a second destination address being the global network address of the host in the global network, and the payload data.

In some examples, the local network is a 6LoWPAN based network. For example, the first source address is an IPv6 link-local address. The first destination address is an IPv6 link-local address. The global network is an IPv6 based network. The second source address is an IPv6 unicast address. The second destination address is an IPv6 unicast address.

In some examples, the first data packet further comprises a compressed network layer header. The processor is further configured to decompress the compressed network layer header to determine the second source address and the second destination address.

In some examples, there is provided a device, for communication between a global network and a local network. The device comprises a processor, and a mapping data store for storing mapping data. The mapping data comprises, for multiple hosts in the global network, a respective global network address and a respective local network address. The mapping data further comprises, for multiple hosts in the local network, a respective global network address and a respective local network address. The processor is configured to, in response to receiving a first data packet from one of the multiple hosts in the global network, the first data packet comprising, a first source address being the global network address of the host in the global network, a first destination address being the global network address of the host in the local network, and payload data, determine, based on the stored mapping data, the local network address of the host in the global network and a local network address of the host in the local network, and send a second data packet over the local network, the second data packet comprising, a second source address being the local network address of the host in the global network, a second destination address being the local network address of the host in the local network, and the payload data.

In some examples, the local network is a 6LoWPAN based network. For example, the second source address is an IPv6 link-local address. The second destination address is an IPv6 link-local address. The global network is an IPv6 based network. The first source address is an IPv6 unicast address. The first destination address is an IPv6 unicast address.

In some examples, the second data packet further comprises a compressed network layer header. Further, in some examples, the processor is further configured to determine the compressed network layer header of the second data packet, based on the second source address and the second destination address.

In some examples, there is provided a method performed by an edge router for secure communication between a global Internet protocol version 6 (IPv6) network and a local network using IPv6 over Low -Power Wireless Personal Area Networks (6L0WPAN). The method comprises storing mapping data. The mapping data comprises for multiple hosts in the global IPv6 network, a respective IPv6 unicast address and a respective IPv6 link-local address. The mapping data further comprising, for multiple hosts in the local network, a respective IPv6 unicast address and a respective IPv6 link-local address. The method further comprises receiving a first data packet from one of the multiple hosts in the local network. The first data packet comprises a first source address being the IPv6 link-local address of the host in the local network, a first destination address being the IPv6 link-local address of the host in the global IPv6 network, and payload data. The method further comprises determining, based on the stored mapping data, the IPv6 unicast address of the host in the local network and an IPv6 unicast address of the host in the global IPv6 network, and sending a second data packet over the global IPv6 network. The second data packet comprises a second source address being the IPv6 unicast address of the host in the local network, a second destination address being the IPv6 unicast address of the host in the global IPv6 network, and the payload data.

In some examples, there is provided a method performed by an edge router for secure communication between a global internet protocol version 6 (IPv6) network and a local network using IPv6 over Low -Power Wireless Personal Area Networks (6LoWPAN). The method comprises storing mapping data. The mapping data comprises, for multiple hosts in the global IPv6 network, a respective IPv6 unicast address and a respective IPv6 link-local address. The mapping data further comprises, for multiple hosts in the local network, a respective IPv6 unicast address and a respective IPv6 link-local address. The method further comprises receiving a first data packet from one of the multiple hosts in the global IPv6 network. The data packet comprises a first source address being the IPv6 unicast address of the host in the global IPv6 network, a first destination address being the IPv6 unicast address of the host in the local network, and payload data. The method further comprises determining, based on the stored mapping data, the IPv6 link-local address of the host in the global IPv6 network and an IPv6 link-local address of the host in the local network, and sending a data packet over the local network. The data packet comprises a second source address being the IPv6 link-local address of the host in the global IPv6 network, a second destination address being the IPv6 link-local address of the host in the local network, and the payload data.

BRIEF DESCRIPTION OF DRAWINGS

The embodiments of the disclosure will now be described with reference to the accompanying drawings, in which:

FIG. 6 illustrates the format of an IEEE802.15.4 MAC packet with header compression, according to some examples;

FIG. 11 is a block diagram illustrating the packet loss in a local network, according to some examples.

DESCRIPTION OF EXAMPLES

Figure 1:
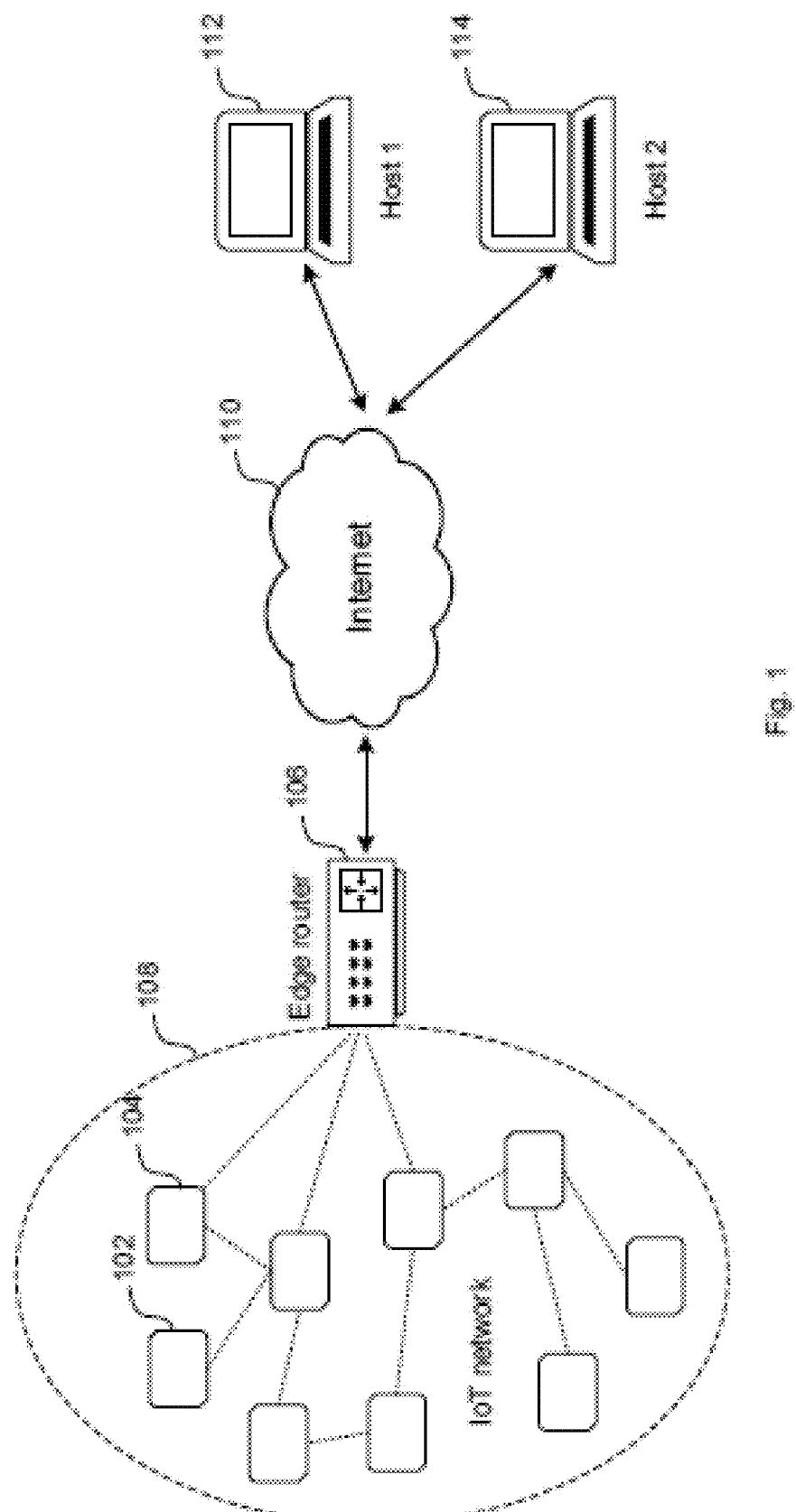
FIG. 1 is a network diagram illustrating an Internet of Things network connected to an Internet, according to some examples.

FIG. 1 Internet of Things (IoT)

FIG. 1 illustrates a local network 108 of devices (e.g. 102 and 104) in communication with hosts via the Internet, according to some examples. The local network 108 is a mesh network topology in which the IoT devices are nodes. A packet is forwarded from one node to another node through the mesh network 108 until the packet reaches a destination node.

The local network 108 is connected to the global network 110 via an edge router 106. The edge router 106 is a device, located at a network boundary, that forwards data packets between computer networks, If the communication protocols applied on the local network 108 differ from the communication protocols applied on the global network, then the edge router 106 performs translation of the format of the communicated data packets from one protocol to another, to facilitate communication across the local and global networks. Accordingly, via the edge router 106, hosts on the global network (e.g. 112 and 114) can communicate with nodes (e.g. 102 and 104) on the mesh network 108.

IoT protocols

For IoT networks, in which the nodes are often low powered, such battery-powered, and utilise low data-rate communication, a communication protocol tailored for IoT network communication provides suitable connectivity for the nodes of the IoT network. Many IoT network protocols define encapsulation and header compression mechanisms that allow Internet packets to be sent and received over low power networks such as IEEE 802.15.4.

An example of a IoT communication protocol that provides low data-rate mesh connectivity is the 'IPv6 over Low-Power Wireless Personal Area Network' (6LoWPAN) protocol. The 6LoWPAN protocol originated from the idea that the Internet Protocol (IP) could and should be applied to even the smallest devices, and that low power devices with limited processing capabilities should be able to participate in the Internet of Things (IoT).

An example of where mesh networks, such as 6LoWPAN, may be applied is in automation and entertainment applications in the home, office and factory environments. 6LoWPAN may also be used on a smart grid, enabling smart meters and other devices to build a mesh network before sending the data back to a billing system via an Internet Protocol version 5 (IPv6) network.

The 6LoWPAN protocol is standardized in Request For Comment (RFC) 6282. RFC6282 is entitled 'Compression Format for IPv6 Datagrams over IEEE 802.15.4-Based Networks', dated September 2011, and is incorporated herein by reference. RFC6282 defines how an IPv6 data frame is encapsulated over an IEEE 802.15.4 radio link. 6LoWPAN introduces an adaptation layer between the IP stack's link and network layers to enable transmission of IPv6 datagrams over IEEE 802.15.4 radio links. RFC6282 defines header compression mechanisms to reduce the size of headers within a 6LoWPAN packet. The compression mechanisms defined in RFC6282 rely on shared context to allow compression of arbitrary prefixes of source and destination addresses.

Various examples, described herein, refer to the application of the 6LowPAN protocol over the local network 108; however, in some examples, other network protocols are utilized to provide communication between the nodes of a IoT network, such as local network 108. Such other networks protocols include ZigBee, ISA100.11.a, WirelessHART, MiWi, Subnetwork Access Protocol (SNAP) or Thread.

Figure 2:
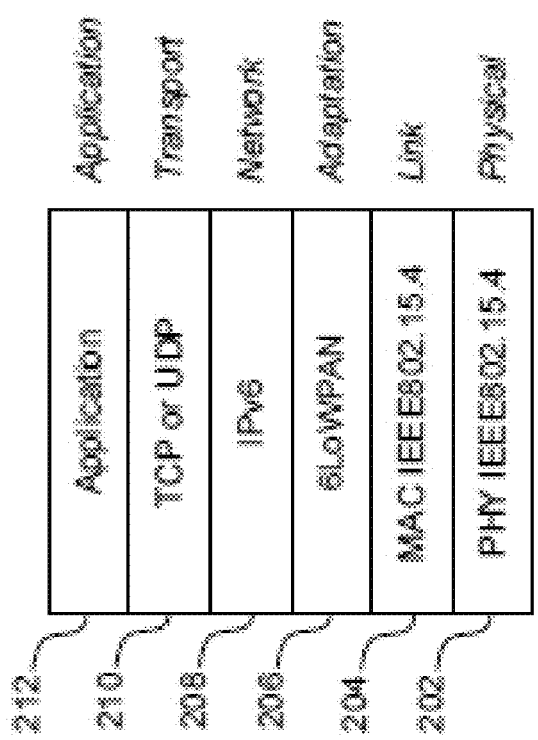
FIG. 2 is a block diagram illustrating the components of a protocol stack, according to some examples.

FIG. 2—Protocol stack

Within the local mesh network, data is communicated in accordance with a protocol stack which defines a set of rules or standards to format data and control the communication of data. FIG. 2 shows a simplified Open Systems Interconnect (051) model of a protocol stack for communication over a network utilizing 6LoWPAN over IEEE 802.15.4, according to some examples.

The physical layer 202 converts data bits into signals that are transmitted and received over the air. The data link layer 204 provides a reliable link between two directly connected nodes by detecting and correcting errors that, in some examples, occur in the physical layer during transmission and receiving. The data link layer includes the media access layer (MAC) which provides access to the media. In the example illustrated in FIG. 2, the MAC layer is IEEE802.15.4. The 6LoWPAN adaptation layer 206 provides adaptation from IPv6 to IEEE 802.15.4

The network layer 208 addresses and routes data through the network, if needed over several hops. IPv6 is the networking protocol illustrated in FIG. 2. The transport layer 210 generates communication sessions between applications running on end devices. The transport layer allows multiple applications on each device to have their own communications channel. Transmission Control Protocol (TCP) is the dominant transport protocol on the Internet. However, TCP is a connection-based protocol with large overhead and therefore not always suitable for devices demanding ultra-low power consumption. For those types of systems, User Datagram Protocol (UDP), a lower overhead, connectionless protocol, can be a better option. Secure transport layer examples include Transport Layer Security (TLS) running atop TCP and Datagram Transport Layer Security (DTLS), which is based on UDP.

Finally, the application layer 210 is responsible for data formatting. It also ensures that data is transported in application-optimal schemes

FIG. 3—Packet Loss

Figure 3:
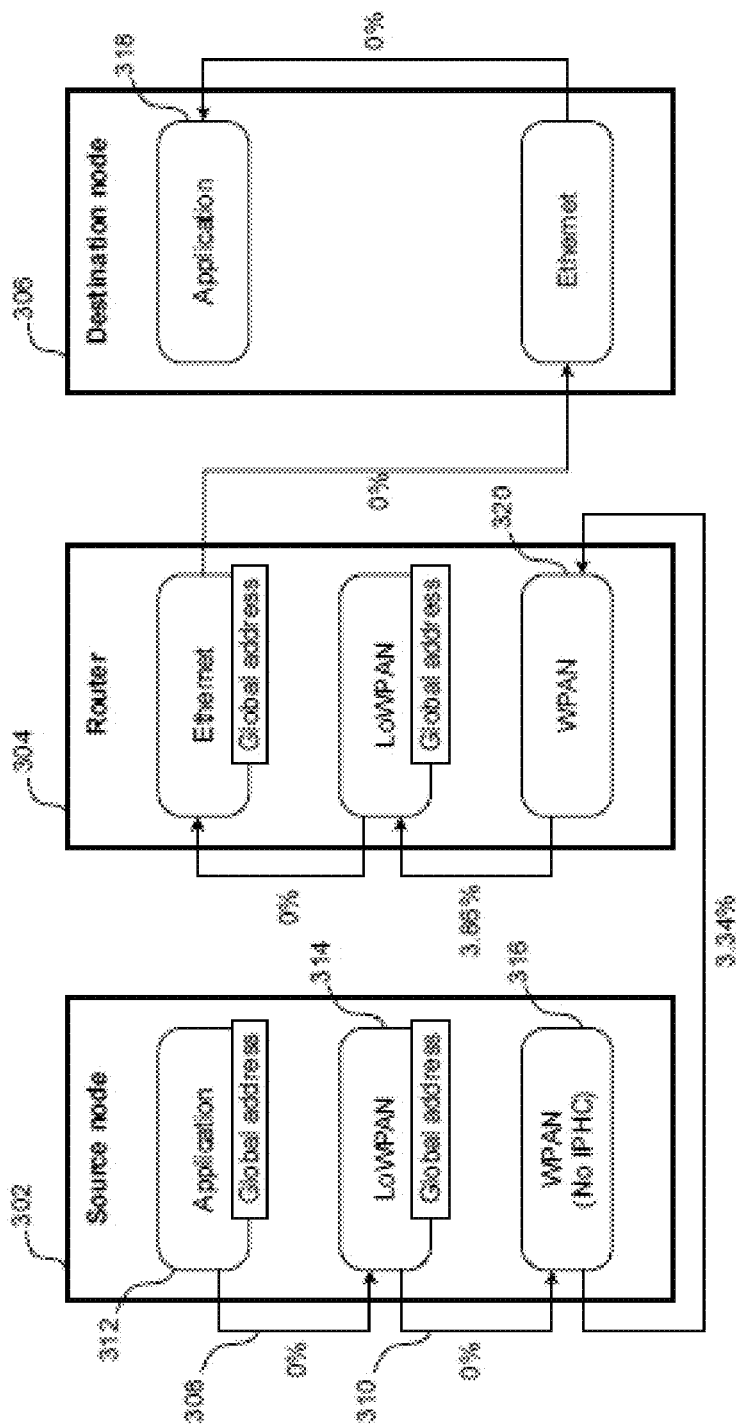
FIG. 3 is a block diagram illustrating the packet loss in a local network, according to some examples.

FIG. 3 illustrates an example of packet loss for communication of packets from a source node 302 on a local mesh network (e.g., a 6LoWPAN network), to a destination node 306 on a global IPv6 network, according to some examples.

Arrowed lines, such as 308 and 310, indicate the path of payload data, as it traverses down the protocol stack of the source node 302 from the Application layer 312 to the 6LoWPAN layer 314, and to the link and physical layers, indicated by 316. As the payload data traverses down the protocol stack, headers are added by the protocol layers. In the example illustrated in FIG. 3, the destination address header comprises an global IPv6 address, and there is no P header compression (IPHC) at the WPAN layer 316.

Percentage values indicate an approximate percentage of packet loss at each stage of the traversal of the payload data from the source node 302 application layer 312 to the application layer 318 of the destination node 306 on the global IPv6 network. For example, approximately zero percent of packets are lost from the application layer 312 to the 6LoWPAN layer 314.

In contrast, approximately 3.34% of packets are lost during transmission from the WPAN layer 316 of the source node 302 to the WPAN layer 320 of the router 304.

Factors Influencing Packet Loss

Factors that increase the packet loss rate include the limited effective payload size of IEEE 802.15.4 packets, The effective payload size of an IEEE 802.15.4 packet is 54 bytes. In some examples, this limited payload size results in fragmentation of a payload across a plurality of packets.

Additionally, the application of encryption protocols, such as Datagram Transport Layer Security (DTLS), to 6LoWPAN IoT networks over IEEE 802.15.4 can be a cause of payload fragmentation due to the payload expansion that occurs as a result of encryption. For example, a 1-byte message can become a 16-byte cipher text, plus 16-byte initialization vector after the message is encrypted with AES. In some examples, the expansion of the payload results in payload fragmentation over a plurality of packets in order to fit the expanded payload in the limited payload field of IEEE802.15.4 packets.

Fragmentation of a payload across a plurality of packets increases the probability that the payload is lost during communication, as an entire payload is lost if one of the plurality of fragments is lost during communication.

Accordingly, it is desirable to reduce the fragmentation of payloads at the adaptation 206 and link 204 layers. Fragmentation at these layers of the protocol stack can be reduced by increasing the effective payload of a link-layer packet. An increase of the effective payload of a packet by n bytes will avoid fragmentation of a packet when the payload exceeds the effective payload of a packet by 1 to n bytes.

Header Compression

It is often desirable for each node of a local network to have a unique address, which is communicated within a header field of communicated packets. The length of the address field depends on the communication protocol utilized by the local network and, in some examples, depend on the number of nodes that must he uniquely identified within the local network.

In some examples, IoT devices, communicating over a local mesh network, communicate via IPv6 addresses, which are 128-bits long and have the capability to allocate each device a globally unique IPv6 address. On the other hand, some mesh network protocols provide addressing formats which allow nodes within the mesh network to communicate with each other using addresses which are shorter than IPv6 unicast addresses, and, in some examples, is only unique within the local network.

For example, nodes within an IEEE802.15.4 mesh network can communicate with each other using IPv6 link-local source and destination addresses. IPv6 link-local addresses are valid only for communications within a local network segment, and they are not routed on the Internet. IPv6 link-local addresses start with hexadecimal bytes FE80, then the least-significant 64-bits of the address are the Interface Identifier (IID).

In accordance with the 6LoWPAN protocol, headers including IPv6 link-local addresses can be compressed via Internet Protocol Header Compression (IPHC). IPHC compression reduces the size of headers and allows more bytes for payload, Accordingly, fragmentation can be reduced through the application of IPHC to link-local addresses for communication within the local network. However, as IPv6 link-local addresses are addresses that are valid only for communications within a defined local network segment, a routable IPv6 address is needed when communicating outside of the local network, Globally unique IPv6 addresses cannot be compressed. Accordingly, it is desirable to benefit from the increase in effective payload size, resulting from header compression, to reduce payload fragmentation, whilst still being able to communicate to hosts outside the local network.

Address Translation to Reduce Fragmentation

It is noted that for many applications of local networks, for example loT mesh networks, the devices on the local network communicate with a known set of global hosts on the Internet. This set is often small with less than 10 or even only a single host in that set to which, for example, a sensor sends sensor data. With the insight that the local devices do not communicate with arbitrary global hosts, the present disclosure provides a router method and device which performs address translation enabling the nodes within a local network to communicate with nodes within a global network, using link-local source and destination addresses within the local network, and globally unique source and destination addresses within the global network.

Accordingly, the present disclosure provides a method for using a combination of link-local IPV6 addresses and global IPV6 addresses (i.e. IPv6 unicast addresses, IPV6 anycast addresses or IPV6 multicast addresses) for the same packet, but at different segments of a network.

Through use of link-local IPv6 address for the source and destination address for packets communicated over the local network, the address fields of the packet headers is compressed, for example, as detailed below. The compression of the headers, allows more bits to be allocated for the payload for packets transmitted within the local network, A larger payload field reduces the number of fragmented packets, or a reduction in the number of fragments, and the reduction of fragmentation results in a reduction in packet loss experienced within the local network.

Advantageously, the present disclosure can reduce the packet loss of an loT network when the network is protected with DTLS or other cryptographic-based methods. Otherwise, the security mechanism like DTLS is not practicable due to the increased packet loss rate, Packet loss leads to re-sending of lost packets, which reduces the overall speed of the network. Therefore, the methods disclosed herein increase the speed of the network by reducing packet loss.

FIG. 4—Edge router

Figure 4:
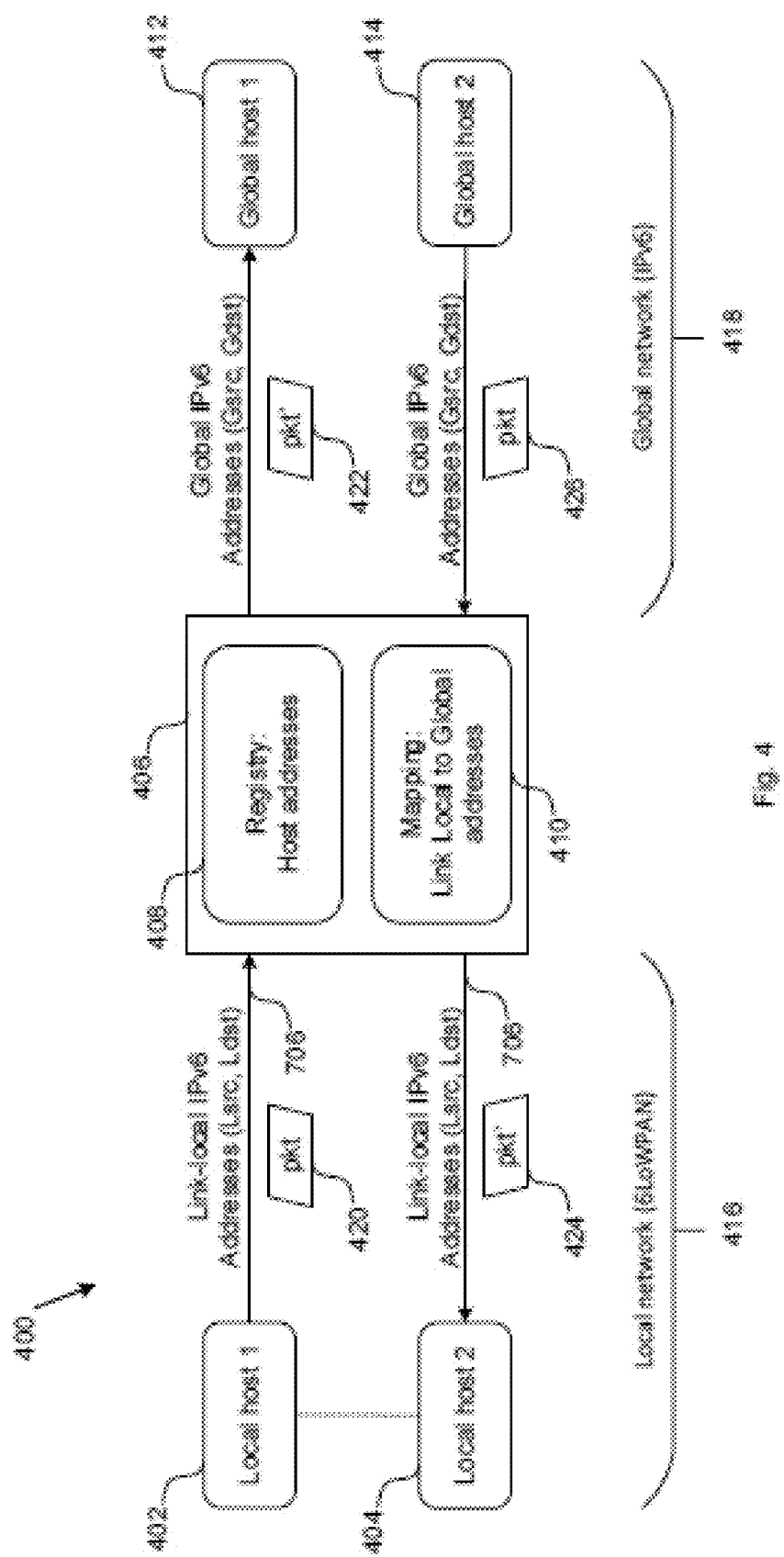
FIG. 4 is a network diagram illustrating the components of a local and global network, according to some examples.

FIG. 4 is a block diagram illustrating a network architecture 400, according to some examples. The network 400 comprises two hosts 402 and 404 which are part of an loT network 416. The network 400 further comprises two hosts 412 and 414, which are part of an Internet network 418, in some examples, the IoT network 416 is considered the local network, and the Internet network 418 is considered the global network.

Local hosts 402 and 404 communicate with global hosts 412 and 414 via an edge router 406. The edge router 406 (herein called a router) performs address translation functions to route communication from the local hosts to the global hosts, and to route communication from the global hosts to the local hosts.

In the example illustrated in FIG. 4, the local network 416 is a 6LoWPAN network, and the global network is an IPv6 network. Accordingly, router 406 interconnects an IEEE 80215.4 6LoWPAN network 416 and an IPv6 network 418.

Inside the local network 416, local hosts address packets with link-local IPV6 addresses. The router 406 receives packets addressed with link-local IPV6 source and destination addresses, and converts the link-local IPV6 source and destination addresses to global IPV6 addresses as the 6LoWPAN packet is converted to an IPV6 packet. More specifically, the router 406 comprises a registry 408 of global hosts (e.g. host 412 and host 414) with which the local hosts of the local network 416 communicate. The router 406 further comprises a store 410 of mapping data. Each local host on the local network, and each global host in the registry 408 of global hosts has a link-local address, and a corresponding global address. The mapping data 410 records a mapping of the link-local address of each host, to the global address of that host.

Figures 5A, 5B:
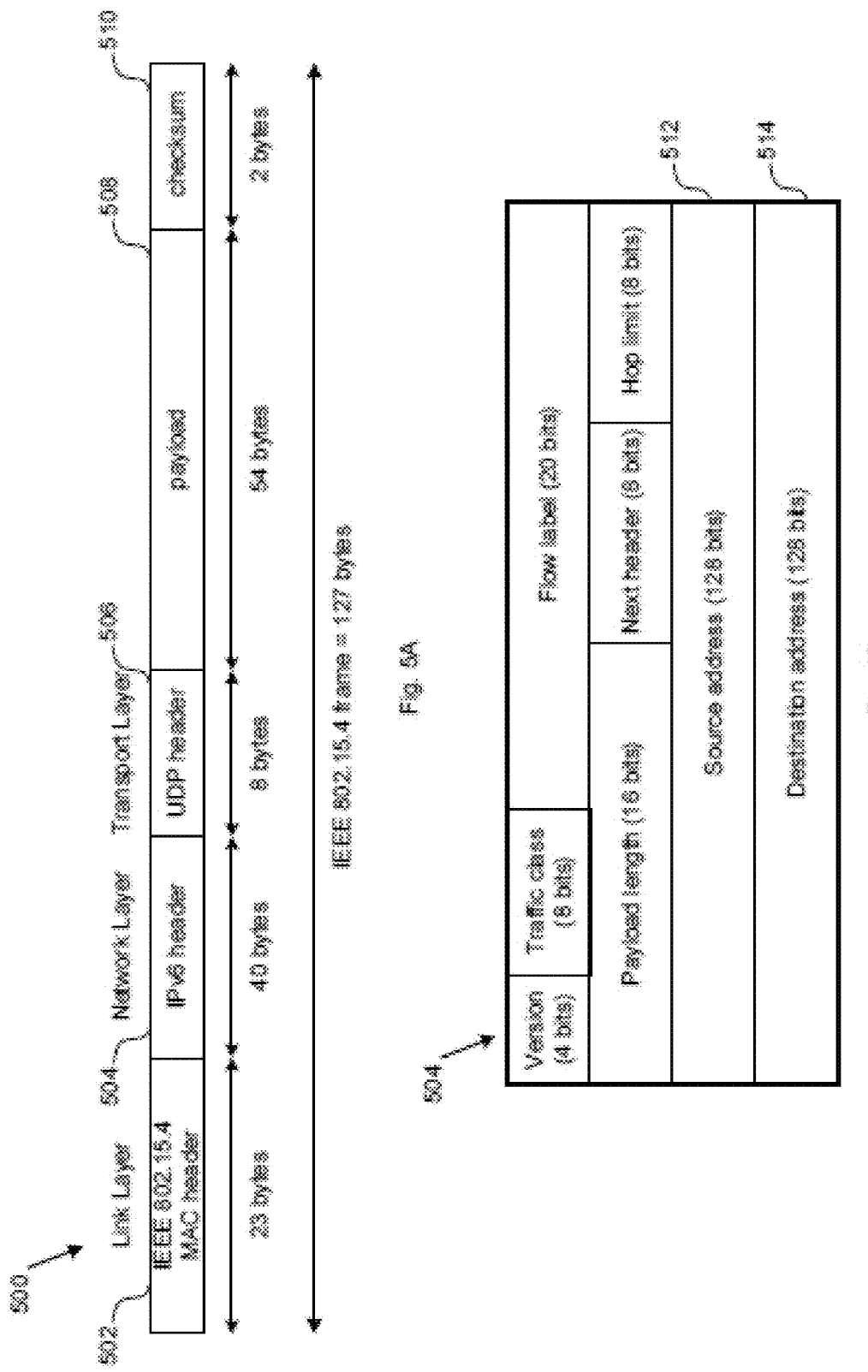
FIG. 5A illustrates the format of an IEEE802.15.4 MAC packet, according to some examples.
FIG. 5B illustrates the format of an IPv6 header, according to some examples.

FIG. 5A—Link-Layer Pocket Packet Format

FIG. 5A illustrates the format for a IEEE802.15.4 link-layer packet 500, according to some examples. An IEEE802.15.4 link-layer packet has a maximum length of 127 bytes, wherein a byte is an octet of bits. The packet 500 comprises a MAC header 502, a 40-byte IPv6 header 504, an 8-byte UDP header 506, a 2-byte checksum 510 and a payload 508 of 54 bytes. In some examples, depending upon the upper layers of the protocol stack, the payload 508 contains further address fields, header fields and data fields.

6LoWPAN Headers

In some examples, the MAC header 502 comprises one or more of three sub-headers: mesh addressing, fragmentation and header compression. Mesh addressing supports layer-two (data link) forwarding and fragmentation supports the transmission of larger payloads. The fragmentation header is omitted for packets that fit into one single IEEE 802.15.4 packet. The mesh header is not used when sending data over one hop only. The format, function and use of the fragmentation and mesh addressing headers are defined within RFC6282, and will not be further described in this disclosure. The header compression sub-header is described below.

FIG. 5B

FIG. 5B illustrates the format of an uncompressed IPv6 header 504, according to some examples. The IPv6 header 504, comprises a 128-bit source address 512 and a 128-bit destination address.

FIG. 6—Header Compression

In accordance with the 6LoWPAN protocol, the 40-byte IPv6 header 504 and the 8-byte UDP header 506 can be compressed, into a smaller 6LoWPAN sub-header, by assuming the usage of common fields. In particular, the 6LoWPAN adaptation layer removes duplicated information, from the IPv6 header, that can be derived from the headers of other layers. In particular, header data that can be derived from the link-layer header, are omitted from the compressed IPv6 header.

FIG. 6 illustrates the format for a iEEE802.15.4 packet 600, to which header compression has been applied in accordance with the 6LoWPAN protocol, according to some examples. The packet 600 comprises a MAC header 602, a 2-byte IPv6 header 604, a 4-byte UDP header 606, a 2-byte checksum 610 and a payload 608 of 96 bytes.

For communication between two devices inside the same 6LoWPAN networking, using link-local addresses, the IPv6 header can be compressed to only 2 bytes, and the UDP header can be compressed to only 4 bytes. Accordingly, in the example shown in FIG. 6, the combined byte size of the IPv6 header and the UDP header can be compressed from 48 bytes to 6 bytes, thus providing an addition 42 bytes for the payload field 608. Therefore, in some examples, payloads which are in the range of 54 bytes to 96 bytes are accommodated within a single link-layer packet, rather than being fragmented across two packets. Through the application of header compression, the percentage of fragmentation can be reduced.

Other Protocols

In an embodiment in which TCP was used instead of UDP at the transport layer, the link-layer packet 500 would comprise a TCP header instead of the UDP header 506. The IPv6 header and the TCP header could be compressed by assuming the usage of common fields, in much the same way that the UDP and IPv6 headers are compressed, in accordance with the standard RFC6282, which standardises 6LowPAN.

In an embodiment in which the local network 108 utilises a communication protocol other than 6LowPAN, the IPv6 header and the TCP or UDP header could be compressed in accordance with the compression method as provided by the standard associated with the utilised communication protocol. For example, in an embodiment hi which the local network protocol, providing communication between the nodes of local network 108, is the Zigbee protocol, the header compression method as provided by the Zigbee standard is 6LowPAN header compression defined in RFC6282. In an embodiment in which the local network protocol is Thread, the header compression is provided by the Thread protocol specification. In some examples, the header compression method applied by the communication protocol, utilised by the local network 108, differs from the header compression method defined in RFC6282; however, various header compression methods provide compression by assuming the use of common fields across headers of the protocol stack.

Figure 7:
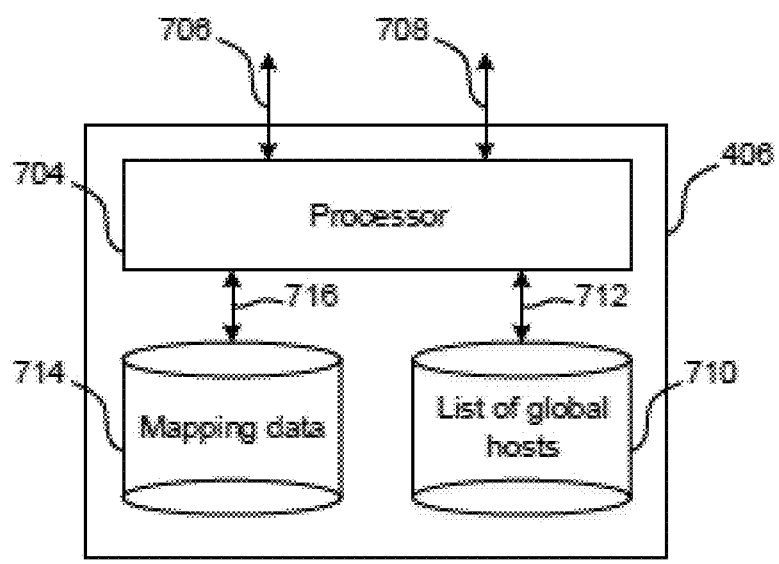
FIG. 7 is a block diagram illustrating the components of a router, according to some examples.

FIG. 7—Router Block Architecture

FIG. 7 is a block diagram illustrating components of router 406. The router 406 comprises a processor 704. In some examples, the processor is a single processing unit, or a plurality of processing units working in concert to process communication packets sent and received by devices on the local network 416.

The router 406 is connected to one or more devices on the local network 416 via a communication connection 706. The router is also connected to one or more host devices on the global network 418 via communications connection 708. In some examples, communication connections 706 and 708 are wired or wireless communication connections.

The router 406 comprises a data store 710 which stores a list of global hosts with which the local hosts of the local network 416 communicate. In some examples, the list of global hosts comprises a list of global IPv6 addresses. In some examples, Further data, such as a host name, permission settings or configuration settings, is stored in conjunction with the global IPv6 addresses, as needed for a particular embodiment.

The router 406 further comprises a mapping data store 714 from which the processor 704 can store and retrieve mapping data via connection 716. The mapping data store 714 stores data pairs comprising a global address of a host and a corresponding local address of the host. For example, the mapping data store 714 stores data pairs comprising a global IPv6 address of a host and a corresponding link-local address of the host. The mapping data store 714 stores such data pairs for one more hosts on the local network 416, and stores such data pairs for each of the global hosts listed in the list of host devices 710.

Figure 8:
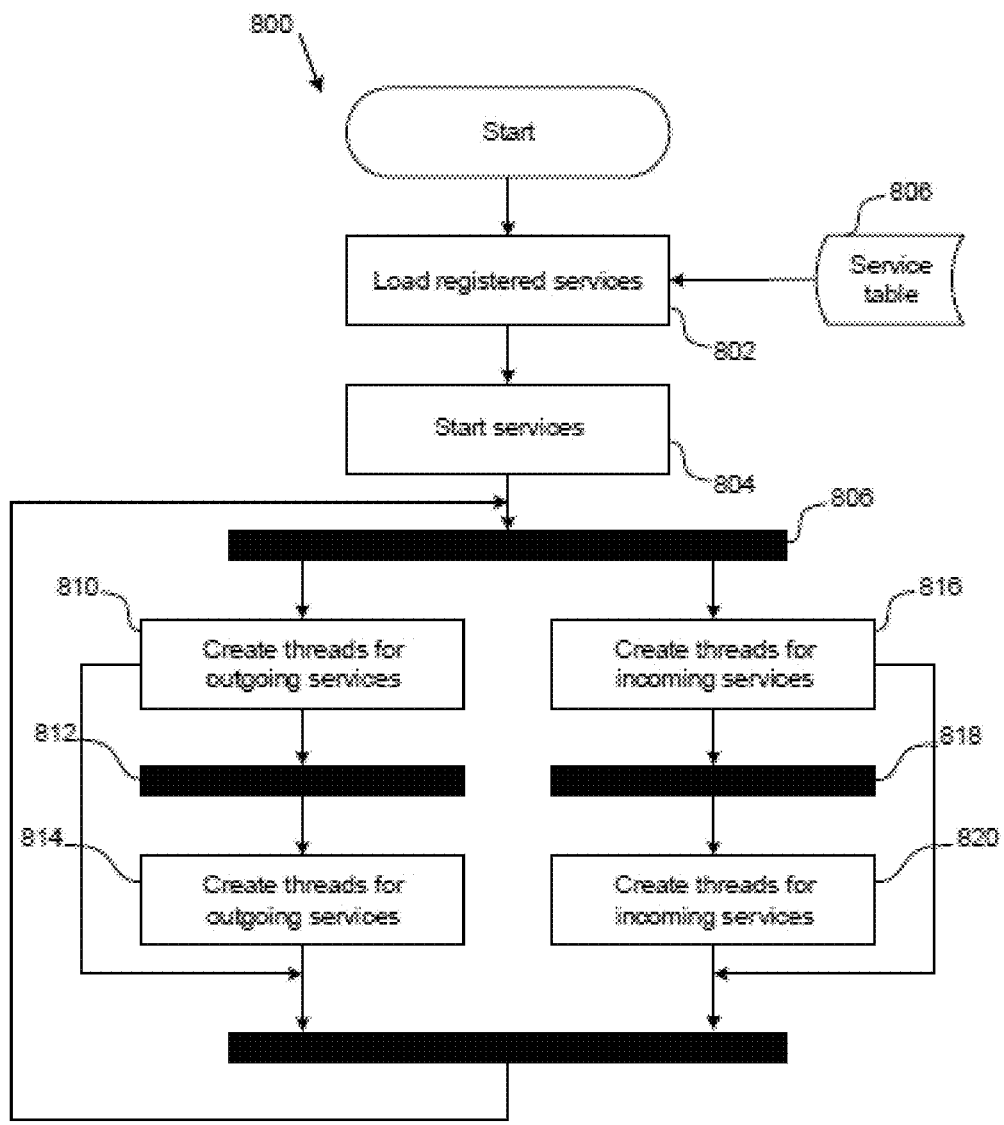
FIG. 8 is a flowchart illustrating a parallel processing method performed by a router, according to some examples.

FIG. 8—Parallel Processing Flowchart

In some examples, to manage the communication throughput of communication between the local and the global networks, the router 406 performs parallel processing of the routed packets. FIG. 8 is a flowchart illustrating a parallel processing method 800 as performed by router 406, according to some examples. Step 802 is a configuration step hi which the router 406 loads registered services into memory accessible by the processor 704. The registered services can be loaded from a service table 806, which, in some examples, are locally accessible to the router 406, or are remotely accessible via communication connection 708. In step 804, the router starts the services and is ready to receive packets from the local network, on connection 706, or from the global network, on connection 708.

At event 806, the router receives a packet from the global network 418 or the local network 416. In response to receiving a packet from the local network 416, the router 406 creates 810 one or more processing threads to process the outgoing packet from the local network, and to forward the processed packet to the destination node in the global network. In response to receiving a packet from the global network 418, the router creates 816 one or more processing threads to process the incoming packet from the global network and to forward the processed packet to the destination node in the local network. In some examples, steps 810 and 816 occur in parallel or in full or partial sequence.

In response to receiving a second packet from the local network 416, as indicated by event 812, the router 406 creates a second thread to process the outgoing packet. Similarly, in response to receiving a packet from the global network 418, as indicated by event 818, the router creates another thread to process the incoming packet.

In some examples, the creation of the threads occurs while other threads are executing, to provide parallel processing of incoming and/or outgoing packets. The router 406 will continue to create threads to process incoming and outgoing packets, as required, in accordance with the processing capabilities of the router.

Figure 9:
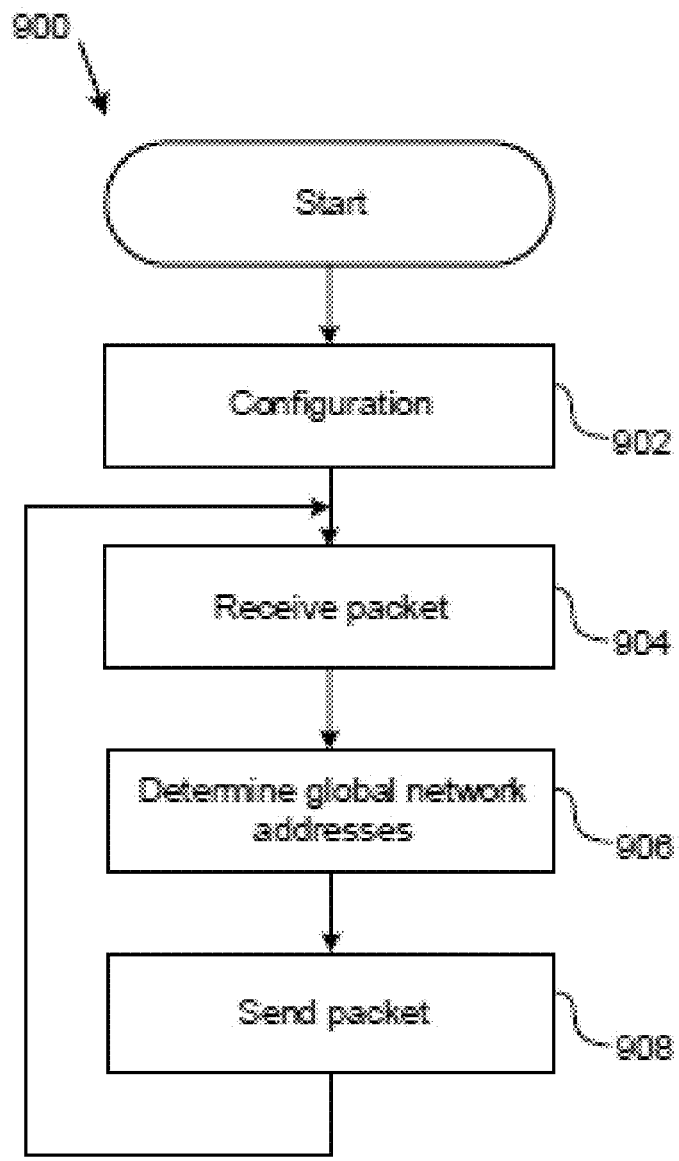
FIG. 9 is a flowchart illustrating a method performed by a router when receiving a packet from a local network, according to some examples.

FIG. 9—Sending from Local Network

FIG. 9 is a flowchart illustrating a method 900 as performed by a router, according to some examples. Step 902 is a configuration step that, in some examples, is performed on start-up of the router, and is performed as needed during operation of the router. In step 902, the router retrieves external host address information. The external host address information comprises the global address of each global host with which the hosts of the local network communicate. In some examples, the router is pre-configured with the list of global hosts. Accordingly, during pre-configuration of the router, the global addresses of the global hosts are stored in memory 710. Additionally, in some examples, additional global hosts are registered with the router after the configuration step 902, as detailed below.

In step 904, the router receives a packet from a local host, over communication connection 706. In step 906, the router parses and/or processes one or more headers of the received packet to determine the local network address (i.e. the source address) of the source node (local host) of the packet. The source address will be a local network address in a local network address format, The router then refers to the mapping data stored in memory 714 to determine the global network address corresponding to the local network address of the source node.

Also in step 906, the router determines the local network address of the destination node. The router determines the local network address of the destination node by parsing the destination address from the headers of the received packet. The destination address will be a local network address in a local network address format. The router then refers to the mapping data stored in memory 714 to determine the global network address corresponding to the local network address of the destination node.

In step 908, the router alters the headers of the packet to replace the local network address of the source node with the corresponding global network address of the source node, and to replace the local network address of the destination node with the corresponding global network address of the destination node. The router then transmits the altered packet, over the global network, to the destination node, wherein the destination node is the global host associated with the global network destination address.

Sending from 6LoWPAN to iPv6

The steps of method 900 will now be described with regard to the embodiment illustrated in FIG. 4, in which the local network is a 6LoWPAN network and the global network is an IPv6 network.

In step 902, the router 406 is pre-configured with the IPv6 global address of each global hosts, 412 and 414, with which the local hosts, 402 and 404, communicate.

In step 904, the router 406 receives a 6LoWPAN adapted IEEE802.15.4 packet 420 over communication connection 706. In step 906, the router 406 decompresses the 6LoWPAN header of the received packet 420, in accordance with the RFC6282 protocol, and parses the decompressed IPv6 header to determine the link-local address of the source node. of the packet 420. The router 406 then refers to the mapping data stored in memory 714 to determine the global network address corresponding to the local network address of the source node.

Also in step 906, the router determines the local network address of the destination node by parsing the decompressed IPv6 header of the received packet 420, in accordance with RFC6282. The router 406 then refers to the mapping data stored in memory 714 to determine the global network address corresponding to the local network address of the destination node.

In step 908, the router 406 alters the headers of the received packet 420, to produce altered packet 422. More specifically, the router 406 alters the headers of the received packet 420 to replace the compressed IPv6 header 604 and the compressed transport layer header 606 with an uncompressed 40-byte IPv6 header 504. The router 406 forms the IPv6 header 504 using the determined global network address of the source node in field 512, and the global network address of the destination node in field 514.

In step 910, the router 406 sends the altered packet 422, over connection 708, to the global host associated with the global network destination address.

Figure 10:
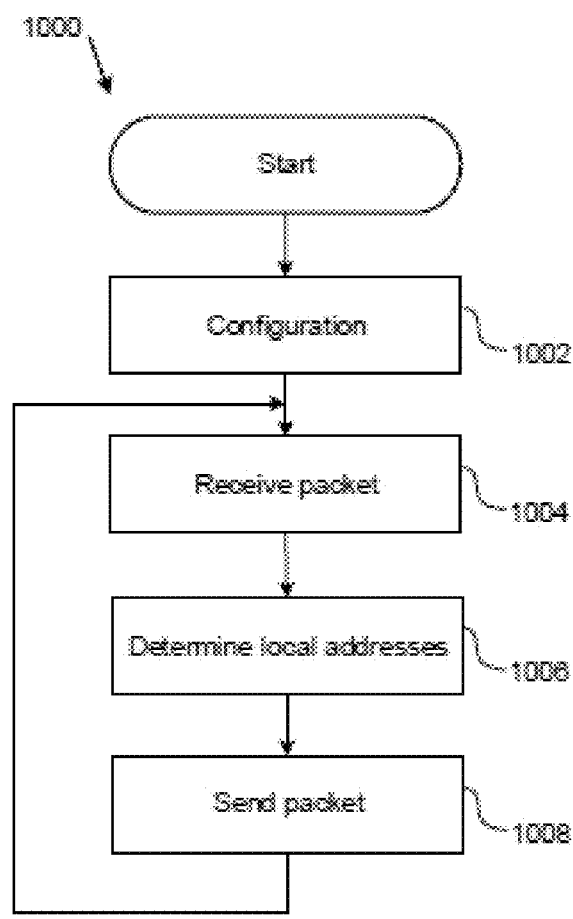
FIG. 10 is a flowchart illustrating a method performed by a router when receiving a packet from a global network, according to some examples.

FIG. 10—Receiving to Local Network

FIG. 10 is a flowchart illustrating a method 1000 as performed by a router, according to some examples. Step 1002 is a configuration step that, in some examples, is performed on start-up of the router, and is performed as needed during operation of the router. In step 1002, the router retrieves local host address information. The local host address information comprises the local address of each local host with which the hosts of the global network communicate. In some examples, the router is pre-configured with the list of local hosts with which the global hosts communicate. Accordingly, during pre-configuration of the router, the local addresses of the local hosts are stored in memory 710, in some examples, the router opens a socket and a processing thread to support the processing of communication to and from each of the local hosts in the list of local hosts.

In step 1004, the router receives a packet from a global host, over communication connection 706. In step 1006, the router parses and/or processes one or more headers of the received packet to determine the global network address (i.e. the source address) of the source node (global host) of the packet. The source address will be a global network address in a global network address format. The router then refers to the mapping data stored in memory 714 to determine the local network address that corresponds to the global network address of the source node.

Also in step 1006, the router determines the global network address of the destination node. The router determines the global network address of the destination node by parsing the destination address from the headers of the received packet. The destination address will be a global network address in a global network address format. The router then refers to the mapping data stored in memory 714 to determine the local network address that corresponds to the global network address of the destination node.

In step 1008, the router alters the headers of the packet to replace the global network address of the source node with the corresponding local network address of the source node, and to replace the global network address of the destination node with the corresponding local network address of the destination node. The router then transmits the altered packet to the destination node, being the local host associated with the local network destination address.

Receiving from IPv6 to 6LoWPAN

The steps of method 1000 will now be described with regard to the embodiment illustrated in FIG. 4, in which the local network is a 6LoWPAN IoT network and the global network is an IPv6 network, In step 1002, the router 406 is pre-configured with the link-local addresses of each local host with which the devices of the Internet 418 communicate.

In step 1004, the router 406 receives an IPv6 packet 426 over communication connection 708. In step 1006, the router 406 parses the IPv6 header of the received packet 426, in accordance with the IPv6 protocol, to determine the IPV6 global address of the source node of the packet 426. The router 406 then refers to the mapping data stored in memory 714 to determine the local network address corresponding to the global network address of the source node, the local network address being a link-local IPv6 address.

Also in step 1006, the router determines the global network address of the destination node by parsing the IPv6 header of the received packet 426, The router 406 then refers to the mapping data stored in memory 714 to determine the local network address corresponding to the global network address of the destination node, the local network address being a link-local IPv6 address.

In step 1008, the router 406 alters the headers of the received packet 426, to produce altered packet 424. More specifically, the router 406 alters the headers of the received packet 426 to replace the IPv6 header 504 and the transport layer header 506 with a 6LoWPAN header comprising a compressed network layer header 604 and a compressed transport layer header 606. The router 406 compresses the headers 504 and 506, in accordance with the 6LoWPAN protocol, using the determined link-local address of the source node, and the link-local address of the destination node.

In step 1010, the router 406 sends the altered packet 424 to the local host associated with the local network destination address.

Opening Sockets

In some embodiments, the router stores and maintains a list of nodes on the local network with which it communicates (e.g. sends packets to or receives packets from). In some examples, this list of local nodes is stored within memory 710 or an alternative memory store accessible to the processor 704.

When receiving the packet from the local network, over communication connection 706, the router 406 determines whether the source node of the packet is a local host that is known to the router 406, by determining whether the address of the local host is one of the addresses in the list of local hosts.

If the source of the packet is a local host that is known to the router 406, then the router obtains a socket for communication with the local host, If the source of the packet is a local host that is not known to the router 406, then the router creates a socket for communication with the local host, and creates a thread to support the processing of incoming packets sent to or from the local host.

Registering a New Global Host

In some examples, a registration process is performed which identifies a new global host as a host with which the local hosts will communicate. During the registration process, the global address of the new global host is communicated to the router, and the router adds the global address of the new global host to the list of hosts stored in memory 710. Additionally, the router determines a local network address for the new global host.

In some examples, the router is configured with the local network address for the new global host, and the router stores the local network address and the corresponding global network address for the new global host in the mapping data store 714. Alternatively, the router determines a suitable local address for the new global host by performing an address allocation process in accordance with the link-layer (or adaptation layer) protocol of the local network.

In an embodiment in which the link-layer is IEEE 802.15.4 and the adaptation layer is 6LoWPAN, the router can determine a suitable link-local address through the application of 'Neighbor Discovery Optimization for IPv6 over Low-Power Wireless Personal Area Networks (6LoWPAN)' as defined in RFC6775. More specifically, the router assigns a link-local address of the format FE80::IID and sends this address in an Neighbor Solicitation (NS) message to all other participants in the subnet to check if the address is being used by someone else. If the router does not receive an Neighbor Advertisement (NA) message within a defined timeframe, the router assumes the new link-local address is unique (on this local network).

FIG. 11—Reduced Packet Loss

FIG. 11 illustrates an example of packet loss for communication of packets from a source node 1102 on a local mesh network (e.g. a 6LoWPAN network), to a destination node 1106 on a global IPv6 network, according to some examples. In the example illustrated in FIG. 11, the router 1104 performs translation of the source and destination address in accordance with the present disclosure.

Arrowed lines, such as 1108 and 1110, indicate the path of payload data, as it traverses down the protocol stack of the source node 1102 from the Application layer to the 6LoWPAN layer, and to the link and physical layers. As the payload data traverses down the protocol stack, headers are added by the protocol layers.

In the example illustrated in FIG. 11, the destination address header comprises a link-local IPv6 address, and IP header compression (IPI-IC) is applied at the WPAN layer 1116. The router 1104 receives the packet with the link local source and destination addresses, and alters the packet to include the corresponding global source and destination addresses (as defined by the router's mapping data). The router then communicates the altered packet to the Ethernet layer of the destination node.

Percentage values indicate an approximate percentage of packet loss at each stage of the traversal of the payload data from the source node 1102 application layer to the application layer of the destination node 1106 on the global IPv6 network. For example, approximately zero percent of packets are lost from the application layer 1112 to the 6LoWPAN layer 1114.

In contrast, to the approximately 3.34% of packets that are lost during transmission from the WPAN layer 316 of the source node 302 to the WPAN layer 320 of the router 304, in the example illustrated in FIG. 3, only approximately 2.6% of packets are lost during transmission from the WPAN layer 1116 of the source node 1102 to the WPAN layer 1120 of the router 1104, in the example illustrated in FIG. 11.

The term 'packet' may be used to describe a formatted unit of data communicated in the network layer of the protocol stack, whereas, the term 'frame' may be used to describe a formatted unit of data communicated in the link layer of the protocol stack. For ease of reference, this disclosure uses the term 'packet' to describe a formatted unit of data communicated in either the link layer, adaptation layer or the network layer of the protocol stack.

A network host is a computer or other device connected to a computer network. In some examples, a host works as a server offering information resources, services, and applications to users or other hosts on the network. Hosts are assigned at least one network address. Network hosts that participate in applications that use the client-server model of computing, are classified as server or client systems.

It will be appreciated by persons skilled in the art that numerous variations and/or modifications may be made to the above-described embodiments, without departing from the broad general scope of the present disclosure. In particular, the method can be applied to various other local network protocols to enable increased payload capacity within a packet, utilizing network layer header compression or compression of non-payload portions of the packet. The present embodiments are, therefore, to be considered in all respects as illustrative and not restrictive.

The invention claimed is:

1. A method, performed by an edge router, for communication between a local network and a global network, the method comprising:
   storing mapping data comprising, for multiple hosts in the global network, a respective global network address and a respective local network address,
   the mapping data further comprising, for multiple hosts in the local network, a respective global network address and a respective local network address;
   receiving a first data packet from one of the multiple hosts in the local network and receiving another data packet from another one of the multiple hosts in the local network, the first data packet and the other data packet each comprising:
- a first source address being the local network address of the corresponding host in the local network,
- a first destination address being the local network address of the corresponding host in the global network, and
- payload data;

for the first data packet and the other data packet in parallel, determining, based on the stored mapping data, the global network address of the corresponding host in the local network and a global network address of the corresponding host in the global network; and for the first data packet and the other data packet, sending a second data packet over the global network, the second data packet comprising:
- a second source address being the global network address of the corresponding host in the local network,
- a second destination address being the global network address of the corresponding host in the global network, and
- the payload data.

2. The method of claim 1, wherein the local network is a mesh network.

3. The method of claim 1, wherein the local network is a 6LoWPAN based network, the first source address is an IPV6 link-local address, and the first destination address is an IPV6 link-local address.

4. The method of claim 1, wherein the global network is an IPV6 based network, the second source address is an IPV6 unicast address, and the second destination address is an IPV6 unicast address.

5. The method of claim 1, wherein the first data packet further comprises a compressed network layer header.

6. The method of claim 1, further comprising decompressing a header of the first data packet to determine the first source address and the first destination address.

7. The method of claim 1, wherein the payload data is encrypted.

8. The method of claim 1, further comprising storing configuration data comprising a list of one or more global network addresses, each address corresponding to one of one or more global hosts in the global network.

9. The method of claim 1, wherein the first data packet further comprises a compressed network layer header and a compressed transport layer header.

10. A method, performed by an edge router, for communication between a global network and a local network, the method comprising:
storing mapping data comprising, for multiple hosts in the global network, a respective global network address and a respective local network address,
the mapping data further comprising, for multiple hosts in the local network, a respective global network address and a respective local network address;
receiving a first data packet from one of the multiple hosts in the global network and receiving another data packet from another one of the multiple hosts in the global network, the first data packet and the other data packet each comprising:
- a first source address being the global network address of the corresponding host in the global network,
- a first destination address being the global network address of the corresponding host in the local network, and
- payload data;

for the first data packet and the other data packet in parallel, determining, based on the stored mapping data, the local network address of the corresponding host in the global network and a local network address of the corresponding host in the local network; and for the first data packet and the other data packet, sending a second data packet over the local network, the second data packet comprising:
- a second source address being the local network address of the corresponding host in the global network,
- a second destination address being the local network address of the corresponding host in the local network, and
- the payload data.

11. The method of claim 10,
wherein the local network is a 6LoWPAN based network, the second source address is an IPv6 link-local address, and the second destination address is an IPV6 link-local address, and
wherein the global network is an IPV6 based network, the first source address is an IPV6 unicast address, and the first destination address is an IPV6 unicast address.

12. The method of claim 10,
wherein the second data packet further comprises a compressed network layer header, and
wherein the method further comprises determining the compressed network layer header of the second data packet, based on the second source address and the second destination address.

13. A device, for communication between a local network and a global network, the device comprising:
a processor, and
a mapping data store for storing mapping data, the mapping data comprising, for multiple hosts in the global network, a respective global network address and a respective local network address,
the mapping data further comprising, for multiple hosts in the local network, a respective global network address and a respective local network address,
the processor configured to:
in response to receiving a first data packet from one of the multiple hosts in the local network and receiving another data packet from another one of the multiple hosts in the local network, the first data packet and the other data packet each comprising:
- a first source address being the local network address of the corresponding host in the local network,
- a first destination address being the local network address of the corresponding host in the global network, and
- payload data, for the first data packet and the other data packet in parallel, determine, based on the stored mapping data, the global network address of the corresponding host in the local network and a global network address of the corresponding host in the global network; and for the first data packet and the other data packet, send a second data packet over the global network, the second data packet comprising:
- a second source address being the global network address of the corresponding host in the local network, a second destination address being the global network address of the corresponding host in the global network, and
the payload data.

14. The device of claim 13,
wherein the local network is a 6LoWPAN based network, the first source address is an IPV6 link-local address, and the first destination address is an IPV6 link-local address, and
wherein the global network is an IPV6 based network, the second source address is an IPV6 unicast address, and the second destination address is an IPV6 unicast address.

15. The device of claim 13,
wherein the first data packet further comprises a compressed network layer header, and
wherein the processor is further configured to decompress the compressed network layer header to determine the second source address and the second destination address.

16. The device of claim 13:
the processor further configured to:
in response to receiving a third data packet from one of the multiple hosts in the global network, the third data packet comprising:
a first source address being the global network address of the host in the global network,
a first destination address being the global network address of the host in the local network, and
payload data,
for the third data packet, determine, based on the stored mapping data, the local network address of the host in the global network and a local network address of the host in the local network; and
for the third data packet, send a fourth data packet over the local network, the fourth data packet comprising:
a second source address being the local network address of the host in the global network,
a second destination address being the local network address of the host in the local network, and
the payload data.

17. The device of claim 16,
wherein the local network is a 6LoWPAN based network, the second source address of the fourth data packet is an IPV6 link-local address, and the second destination address of the fourth data packet is an IPV6 link-local address, and
wherein the global network is an IPV6 based network, the first source address of the third data packet is an IPV6 unicast address, and the first destination address of the third data packet is an IPV6 unicast address.

18. The device of claim 16,
wherein the fourth data packet further comprises a compressed network layer header, and
wherein the processor is further configured to determine the compressed network layer header of the fourth data packet, based on the second source address and the second destination address of the fourth data packet.

19. The device of claim 16, wherein the local network is a 6LoWPAN based network, the first source address is an IPV6 link-local address, and the first destination address is an IPV6 link-local address.

20. The device of claim 16,
wherein the fourth data packet further comprises a compressed network layer header and a compressed transport layer header.

* * * * *